United States Patent [19]
Ishikawa

[11] Patent Number: 6,095,270
[45] Date of Patent: Aug. 1, 2000

[54] BATTERY CARRIER LOCK FOR ELECTRIC POWER ASSISTED VEHICLE

[75] Inventor: Satoshi Ishikawa, Iwata, Japan

[73] Assignee: Yamaha Hatsudoki Kabushiki Kaisha, Iwata, Japan

[21] Appl. No.: 08/905,791

[22] Filed: Jul. 28, 1997

[30] Foreign Application Priority Data

Jul. 31, 1996 [JP] Japan ................................ 8-201630

[51] Int. Cl.$^7$ .................................................. B60R 16/04
[52] U.S. Cl. ........................... 180/68.5; 70/233; 180/220; 224/412
[58] Field of Search ................................. 180/68.5, 65.1, 180/220; 70/233, 236; 224/412, 419

[56] References Cited

U.S. PATENT DOCUMENTS

| | | | |
|---|---|---|---|
| 4,044,852 | 8/1977 | Lewis | 180/68.5 |
| 4,416,413 | 11/1983 | Chester | 232/24 |
| 5,020,625 | 6/1991 | Yamauchi | 180/68.5 |
| 5,487,285 | 1/1996 | Leitchel | 70/18 |
| 5,570,752 | 11/1996 | Takata | 180/68.5 |

FOREIGN PATENT DOCUMENTS

| | | | |
|---|---|---|---|
| 636536 | 2/1995 | European Pat. Off. | |
| 712779 | 5/1996 | European Pat. Off. | |
| 715982 | 6/1996 | European Pat. Off. | |
| 0 715 982 A3 | 12/1996 | European Pat. Off. | 180/68.5 |
| H7-215265 | 1/1994 | Japan | 180/68.5 |
| H9-104379 | 10/1995 | Japan | 180/68.5 |

*Primary Examiner*—Michael Mar
*Attorney, Agent, or Firm*—Knobbe, Martens, Olson & Bear LLP

[57] ABSTRACT

A battery carrier, battery box and locking assembly for an electric power assisted vehicle, such as a bicicle. The battery box comprises a base portion having a cup shape and which is adapted to detachably receive the battery carrier. The battery carrier and the guide portion have interengaging parts for locating and assisting in the insertion and removal of the battery carrier from the base portion of the barrery box. A lock is provided in the battery box for detachably locking the battery carrier in the battery box. The lock is designed so that the key which operates it can only be removed when the lock is in the locked position. The lock keeper is spring biased and cam operate so that it will become automaticlly latched with the battery carrier when the battery carrier is put in place in the battery box.

5 Claims, 7 Drawing Sheets

BATTERY CARRIER LOCK FOR ELECTRIC POWER ASSISTED VEHICLE

BACKGROUND OF THE INVENTION

This invention relates to an electric motor assisted vehicle and more particularly to an improved battery carrier lock therefor.

There have been proposed a class of vehicle wherein the vehicle is powered primarily by a manual input force of the operator. However, there is also incorporated an electric motor assist which provides assist power for assisting the operator's manual propulsion of the associated vehicle. Although the type of vehicle employed for this purpose may be of a wide variety, this type of system is frequently used on land vehicles such as bicycles that have a generally open construction.

Specifically, the type of system generally employs a manual force receiving device such as a pedal operated crank mechanism that drives a transmission for driving an output shaft for propelling the vehicle. An electric motor is employed in conjunction with this pedal operated mechanism for providing electric power assist for driving the vehicle. Generally, at least one sensor is also incorporated in this mechanism that senses the input force of the operator to the pedal operated mechanism. This sensed signal is then sent to a controller which, in turn, controls the transmission of electrical power from a battery to the electric motor for determining the amount of electric power assist.

This type of vehicle derives the electrical power for operating the electric motor from a rechargeable type battery. Conventionally, the type of battery utilized is comprised of a battery pack that consists of a number of individual rechargeable cells that are wired in series with each other. For convenience, these cells are generally contained within an outer container that has terminals that afford the connection to the electric motor and controls for it.

Frequently, it is desirable to ensure that the battery itself may be removed from the vehicle and taken to a remote location for charging. To achieve this, it has been proposed to put the battery pack into an outer housing or battery carrier. This battery carrier is then, in turn, mounted in a battery case that is fixed in some way to the vehicle so that, upon insertion, it will be electrically connected to the electric motor and its control Of course, it should be easy to insert and remove the battery carrier for charging and replacement.

Because of the fact that the battery can be easily removed and returned for charging purposes, there is some risk of battery theft. Therefore, it is desirable to provide a lock for locking the battery carrier in the battery box when installed in the vehicle so as to prevent theft.

It is, therefore, a principal object to this invention to provide an improved battery carrier lock for an electric assisted vehicle.

In connection with the lock for the battery carrier, it is also desirable that the lock be one which can be easily operated by the user. For example, it is particularly desirable if the battery lock can be released by the operator through the use of a key or other like device. However, it is desirable to minimize the amount of operation which the operator must undergo when removing and when re-inserting the battery. Furthermore, it is desirable if the locking mechanism operates in such a way that the operator cannot inadvertently leave the lock in an unlocked condition.

It is, therefore, a further object to this invention to provide an improved battery carrier lock for an electrically assisted vehicle wherein the lock cannot be inadvertently left in the unlocked condition and will automatically lock upon re-insertion of the battery carrier into the battery box.

SUMMARY OF THE INVENTION

This invention is adapted to be embodied in a detachable battery assembly for an electrically powered vehicle. The battery assembly comprises a battery box that is adapted to receive an elongated battery carrier and which is fixed to the vehicle in an accessible position. The battery box includes a selectively engageable lock that cooperates with the battery carrier to lock the battery carrier in the battery box.

In accordance with one feature of the invention, the lock includes means that prevents the lock from being left in an unlocked position.

In accordance with another feature of the invention, the lock automatically locks upon insertion of the battery carrier into the battery box.

BRIEF DESCRIPTION OF THE DRAWINGS

FIGS. 7–11 are cross-sectional views of the lock, in part similar to FIG. 5 but on a smaller scale, and show the cooperation with the battery carrier in various conditions.

DETAILED DESCRIPTION OF THE PREFERRED EMBODIMENT OF THE INVENTION

Figure 1:
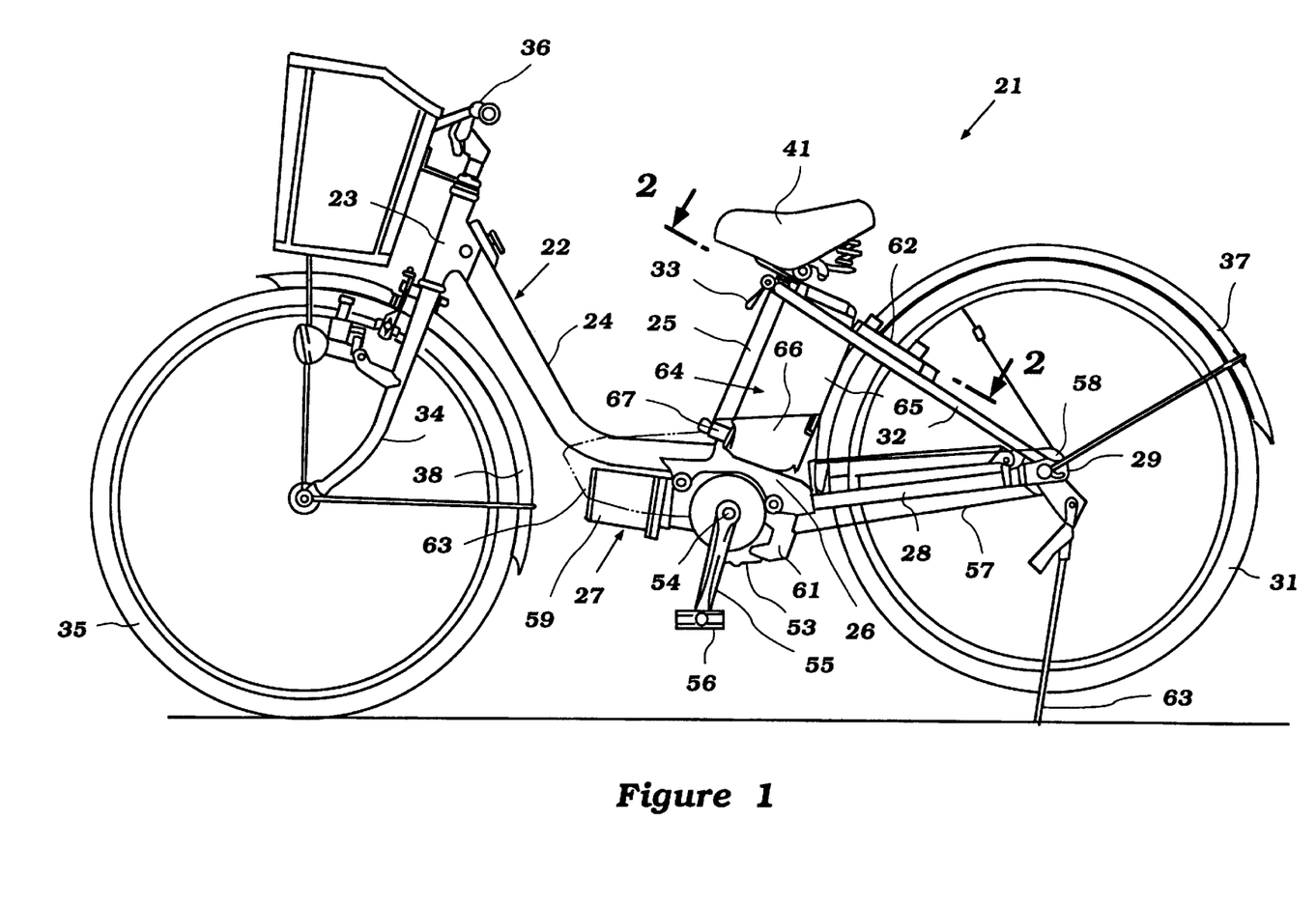
FIG. 1 is a side elevational view of a bicycle constructed in accordance with a preferred embodiment of the invention.

A bicycle constructed in accordance with an embodiment of the invention is illustrated primarily in FIG. 1. The bicycle is indicated generally by the reference numeral 21 and includes a frame assembly, indicated generally by the reference numeral 22. The frame assembly 22 includes a head pipe 23, a down tube 24, and a seat tube 25. The down tube 24 and seat tube 25 are connected to each other and to a bracket assembly, indicated generally by the reference numeral 26 and which includes the drive unit, indicated generally by the reference numeral 27 which may be of the type shown and described in detail in the co-pending application entitled "SENSOR FOR ELECTRIC MOTOR ASSISTED VEHICLE", Ser. No. 08/887,489, Filed Jul. 2, 1997 (Attorney Docket No.YAMAH4.274A) and assigned to the assignee hereof.

A pair of chain stays 28 extend rearwardly from and are connected to the bracket 26. The chain stays 28, in turn, carry a rear wheel bracket 29 on which a rear wheel 31 is rotatably journaled in a known manner. A pair of seat stays 32 extend downwardly from the upper end of the seat tube 25 so as to provide triangular reinforcement for the assembly. The upper and forward ends of the seat stays are connected to the upper end of the seat tube 25 by a clamp 33.

A front fork 34 is journaled by the head tube 23 and rotatably journals a front wheel 35. The front fork 34 is dirigibly supported in the head pipe 23 and carries a handlebar assembly 36 at its upper end for steering of the bicycle 21 in a well-known manner. The rear and front wheels 31 and 35 are partially covered by respective fenders 37 and 38.

Figure 3:
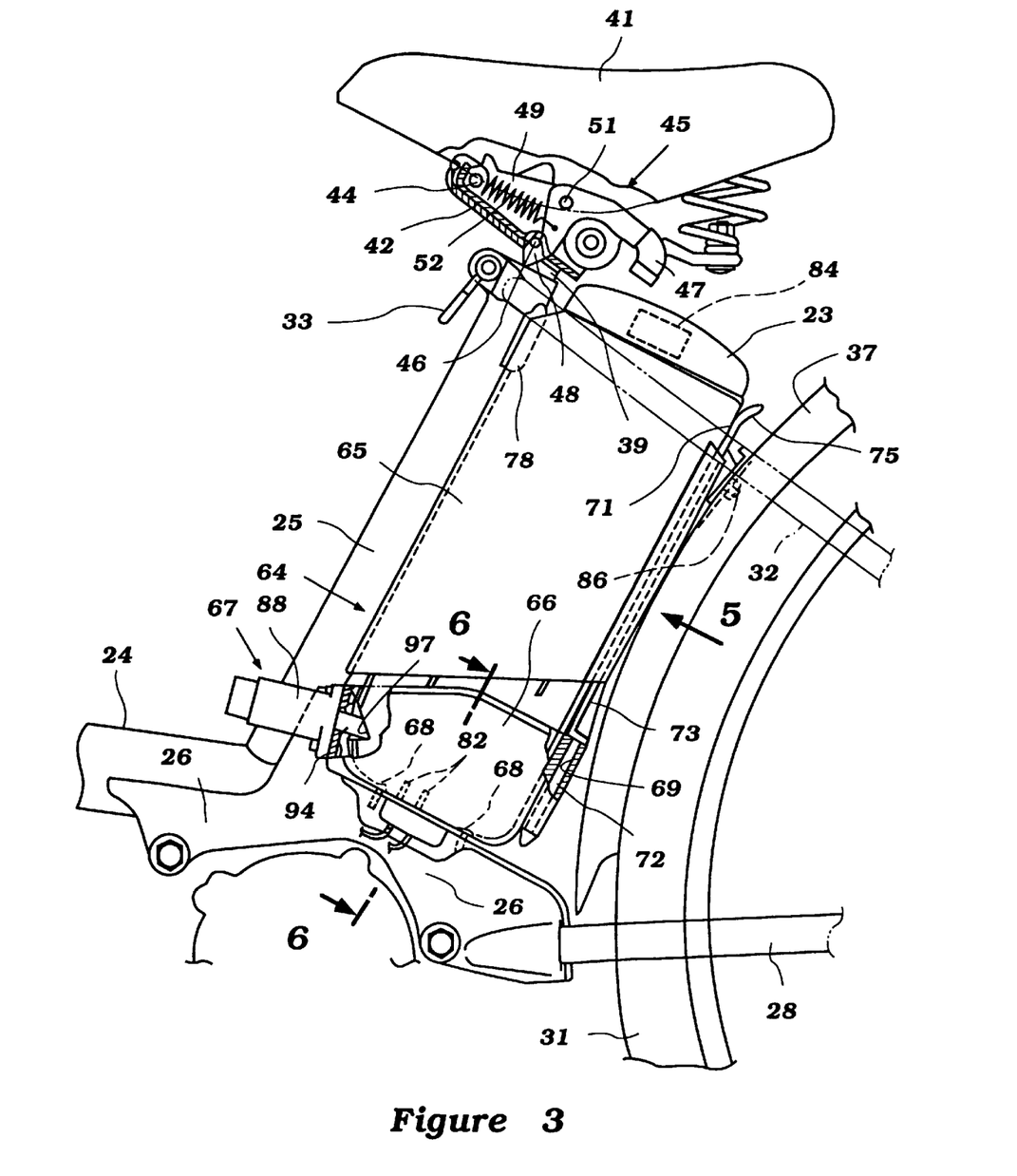
FIG. 3 is an enlarged side elevational view of a portion of the bicycle shown in FIG. 1 and illustrates the components shown primarily in FIG. 2 but illustrating the bicycle in solid line view and the seat in its normal riding position.
Figure 4:
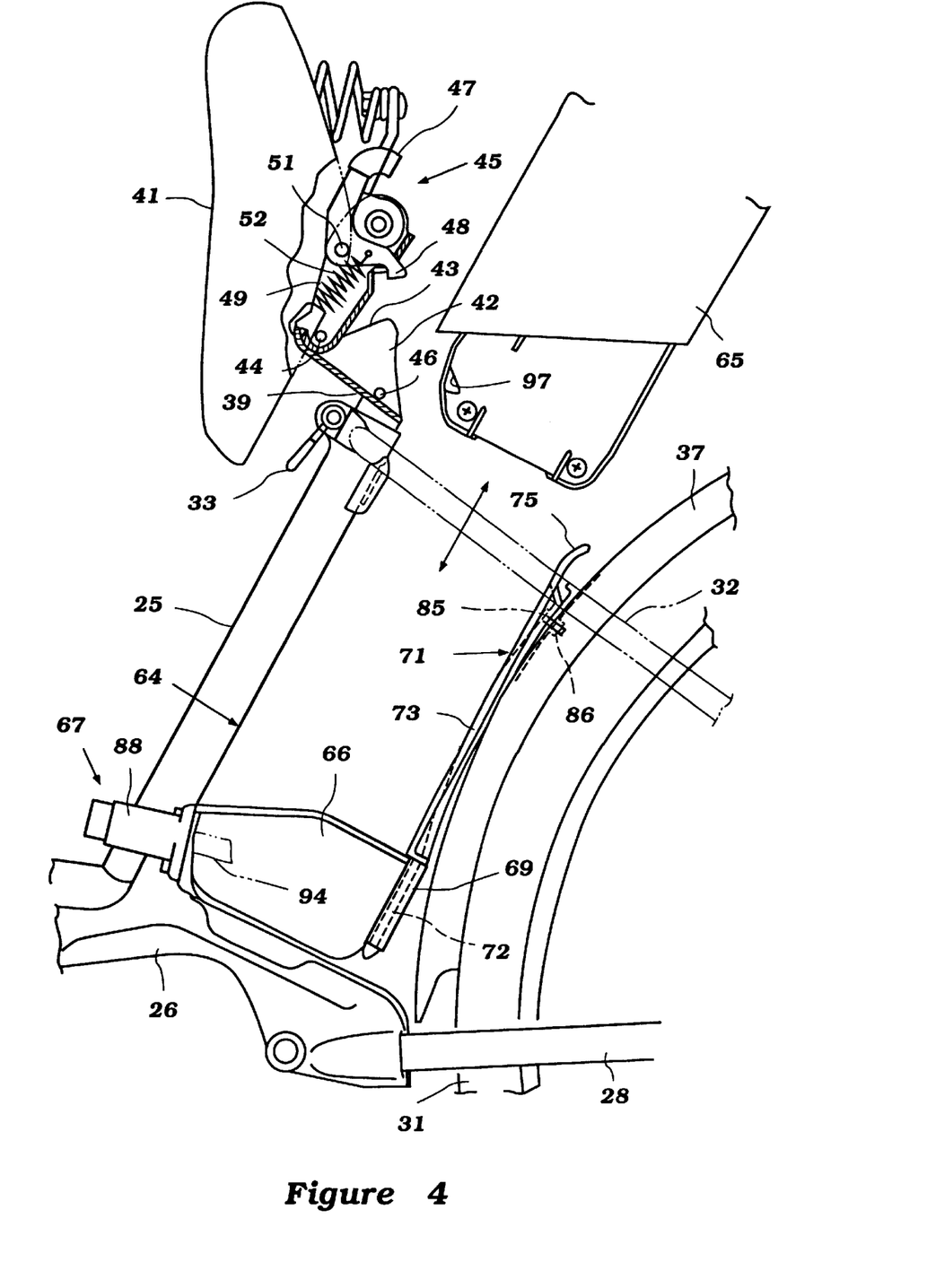
FIG. 4 is a partial side elevational view, in part similar to FIG. 3 but shows the position of the seat and position of the battery carrier upon installation and removal.

A seat post 39 (FIGS. 3 and 4) is slidably supported in the seat tube 25 and pivotally carries a seat 41 on which a seated rider may operate the bicycle 21. The seat 41 is pivotally carried by the seat post 39 for a reason which will be described. However, this mechanism will be described now by reference to FIGS. 3 and 4. FIG. 3 shows the seat in its normal riding position while FIG. 4 shows it pivoted upwardly for access and service purposes.

A bracket assembly 42 is affixed to the upper end of the seat post 39 in any suitable manner. This bracket has a pair of side portions 43 that receive a pivot pin 44 to establish a pivotal connection to the seat 41.

A latch mechanism, indicated generally by the reference numeral 45 is provided for detachably latching the seat 41 in its normal operative riding position. This latch mechanism 45 includes a keeper pin 46 that spans the side portion 43 of the bracket 42. A pivotally supported latch element 47 has a retainer portion 48 that normally is held in engagement with the keeper pin 46 when the seat 41 is in its normal, riding position. The latch member 47 is pivotally supported on a base element 49 of the seat by means of a pivot pin 51. A coil compression spring 52 holds the latch 45 in this engaged position.

However, by pivoting the lever 47 in an upward or clockwise direction, the portion 48 moves free of the pin 46 and the seat 41 can be tilted upwardly. Upon return of the seat 41 to its normal riding position, the latch mechanism 45 will again engage.

Referring again primarily to FIG. 1, the drive unit 27 is comprised of an outer housing assembly, indicated generally by the reference numeral 53 that journals a crankshaft 54 for rotation about a transversely extending axis. The crankshaft 54 has affixed to its exposed ends a pair of crank arms 55 each of which journals a pedal 56 at its outer extremity. Thus, the pedals 56 may be conveniently operated by a rider seated on the seat 41.

The crankshaft 54 is connected through a step-up transmission to drive a drive sprocket (not shown) which, in turn, drives a chain 57. The chain 57 is entrained around a driven sprocket 58 that is affixed for rotation with an and which drives the rear wheel 31.

In addition, an electric motor 59 forms a part of the propulsion unit 27 and offers electric power assist to assist the manual force applied to the pedals 56. The electric motor 59 drives the aforenoted and not shown sprocket through a step down transmission.

A controller 61 receives input data such as the force applied by the rider to the pedals 56 and the speed of rotation or travel so as to control the power assist provided by the motor 59. This structure may be of any type known in the art and reference may be had to either the aforenoted copending application or U.S. Pat. No. 5,570,752, issued Nov. 5, 1996, for the constructions and control strategies that may be utilized to practice the invention.

A rear wheel lock 62 may be carried by the seat stay 32 for locking the rear wheel 31 when the bicycle is not in use, for example when supported on a kick stand 63. If desired, a cover assembly 60 may be carried by the frame 22 to afford cover and protection for the mounting bracket 26 and a portion of the propulsion unit 27.

As may be seen in FIG. 1, a battery box, indicated generally at 64, is positioned to the rear end of the seat pipe 25 and between the seat stays 32. This permits a rechargeable battery carrier 65 to be inserted or removed from the battery box 64 in a vertical direction when the seat 41 is pivoted to the position shown in FIG. 4. The battery box 64 has a base portion 66 which, as will be described, affords the electrical connection between the battery carrier 65 and the drive unit 27. This interrelationship will be described shortly.

The battery box 64 and its connection with the battery carrier 65 will be described now in detail by reference primarily to FIGS. 2–4. This mechanism includes a battery lock, indicated generally by the reference numeral 67 which will be described later in more detailed reference to FIGS. 5–11.

As has been noted, the battery box 64 has a base portion which is indicated generally by the reference numeral 66 and which has a generally cup shape. This base 66 is affixed to the upper side of the mounting bracket 26 by threaded fasteners 68. The base 66 forms a generally upwardly extending opening that extends, in position, parallel to the seat tube 25 and immediately to the rear of it. The seat post 25 is moved forwardly from the rear fender 37 so as to provide adequate area for the battery 65 and maintain a good center of balance for the bicycle 21.

The base portion 66 is formed with a receptacle-type opening, indicated by the reference numeral 69. This opening 67 receives a guide member, indicated generally by the reference numeral 71. The guide member 71 is formed from a soft plastic material such as a polypropylene and has a bayonet-type base portion 72 that is detachably received in the opening 67 when pressed thereinto.

This guide member 71 extends vertically upwardly forwardly of the back fender 37 and has a curved bearing part 73 which is configured so as to engage the battery case 65 when inserted in place and to bias it generally in a forward direction. The side parts, indicated by the reference numeral 74,(FIG. 2) of the guide portion 71 are configured for a purpose which will be described. There is further provided a curved guide in end 75 at the upper extremity of the guide member 71.

The battery 65 and specifically the battery carrier is comprise of a two piece outer case, indicated generally by the reference numeral 76, and which contains a plurality of rechargeable battery cell such ni-cad cells that are packaged in a shrink type container for protection in addition to that provided by the battery case 76.

Figure 2:
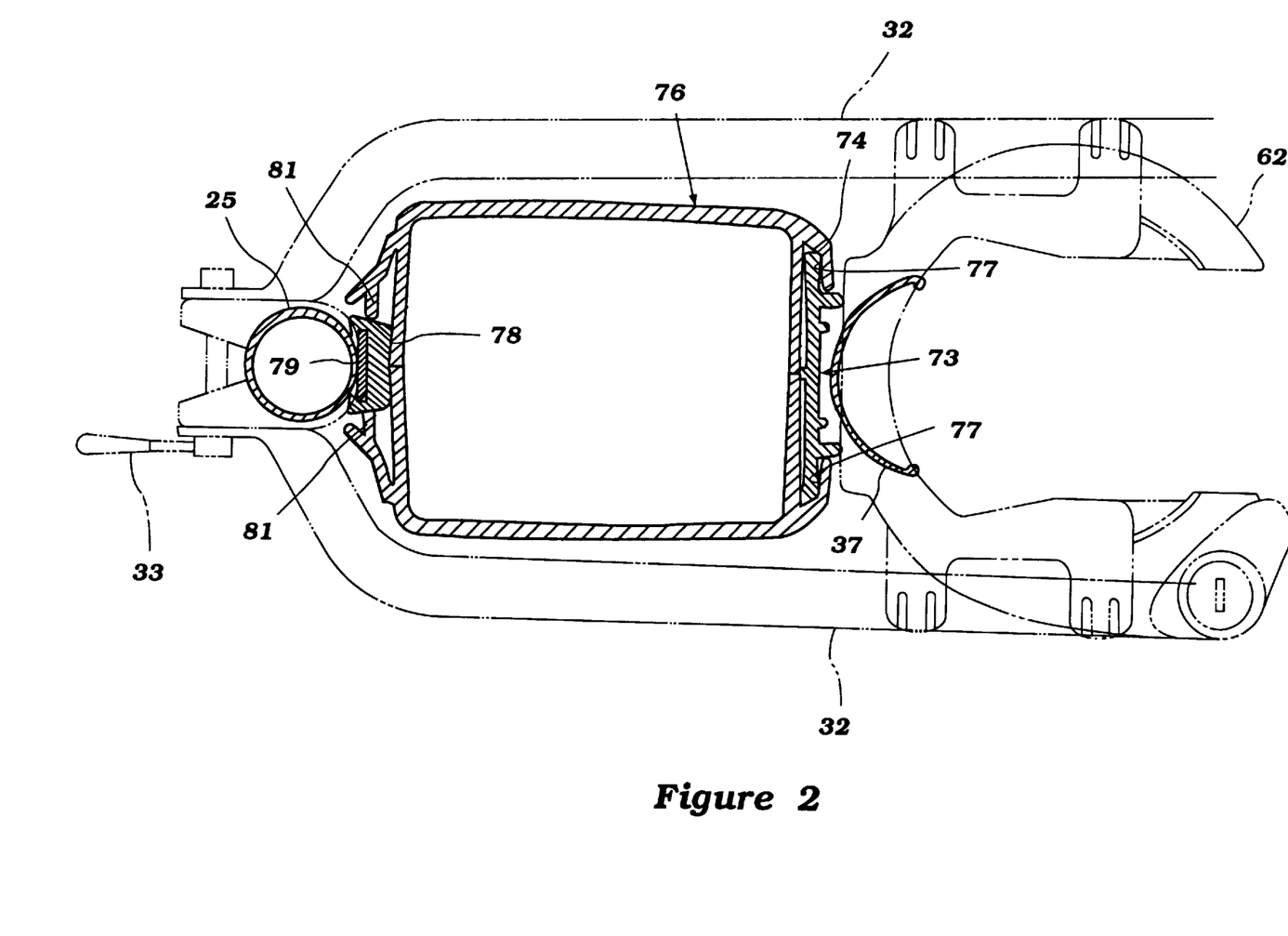
FIG. 2 is in enlarged cross-sectional view taken along the line 2—2 of FIG. 1 with the battery carrier and battery box being shown in solid lines as well as their attachment to the frame with the remaining components shown in phantom.

As best seen in FIG. 2, the battery case 65 rear surface has a cross-section that defines a pair of recesses 77 which are complimentary to and which receive the end portions 74 of the guide member 71. Thus, this tongue and groove interaction will guide battery case 76 and contain batteries when inserted into matting relationship with the base 66.

In addition, a snubber 78 is carried at the rear of the seat post 25 on a metallic backing plate 79. The corresponding part of the battery case 76 has a pair of inwardly extending cabs 81 which engages the side of the snubber 76 and will guide it also at the forward end. The biasing of the portion 73 of the guide 71 will hold the battery case 76 forwardly in this assembled relationship against the snubber 78 so as to resist rattling and motion.

As may be best seen in FIG. 3, the base portions 66 of the battery box 64 is provided with a pair of terminals 82 that mate with corresponding terminals carried at the lower end of the battery case 76 and in contact with the cells thereof so as to permit electrical connection when the battery carrier 65 is positioned in the battery case 64 and specifically the base portion 66 thereof.

The battery carrier 65 is also provided with a carrying handle 83 at the upper end thereof that carries a terminal 84 for charging of the battery either in location or when moved to a remote location.

Since the battery carrier 65 itself forms the major outer portion of the covering for the batteries when in place, the structure is much smaller and more compact than prior art type of construction. Furthermore, the insertion and removal is facilitated by the described construction and this makes the device very easy to manipulate and utilize by riders.

The upper end of the guide member 71 is also provided with an opening that may receive a further fastener 85 and 86 so as to bolt it to the rear fender 37 so as to offer further stability to the assemblage.

The function and operation of the lock assembly 67 will now be described by reference to FIGS. 5–11. Basically, the lock assembly 67 functions to detachably retain the battery carrier 65 in the battery box 64. Upon its release, the battery carrier 65 may be removed. However, the key, indicated by the reference numeral 87 that is utilized with the lock 67 cannot be removed until the lock 67 is reset in its automatic locking position. In this way, the operator need only unlock the lock 67 to remove the battery carrier 65 and when the battery carrier 65 is reinserted, it will be automatically locked in position.

The lock 67 includes an outer housing 88 that has a cylindrical portion which terminates at one end in a larger diameter cylindrical flange 89. This flange 89 is formed with tapped openings 91 that receive threaded fasteners for detachably affixing it to the bracket assembly 66. These fasteners are concealed within the bracket assembly 66 and hence, the lock 67 cannot be easily disassembled from the bicycle 21.

The flange portion 89 has a small cylindrical projection 92 that passes through an opening in the bracket 66 and which defines a cylindrical bore 93. A keeper 94 is slidably supported within this opening 93 and has an inclined wedge locking surface 95. As may be best seen in FIGS. 7 and 8, the lower portion 96 of the battery carrier 65 is formed with a complimentary receiving notch 97 for the keeper 94. When in the position shown in FIG. 7, the battery carrier 65 is locked in the battery case 64 and specifically at base portions 66.

The lock mechanism 67 includes a sliding cylinder 98 that is received within a larger bore 99 formed in the housing member 88. A coil compression spring 101 acts between the sliding plunger 98 and the housing 88 for normally urging plunger 98 to the position shown in FIGS. 5 and 6, which is the released position.

The keeper 94 further is formed with a bore 102 in which a smaller plunger 103 reciprocates. A coil compression spring 104, which is lighter than the spring 101 acts on the plunger 103 to normally urge it into engagement with a recess 105 formed in an end plate 106 of the cylinder 98.

Figure 5:
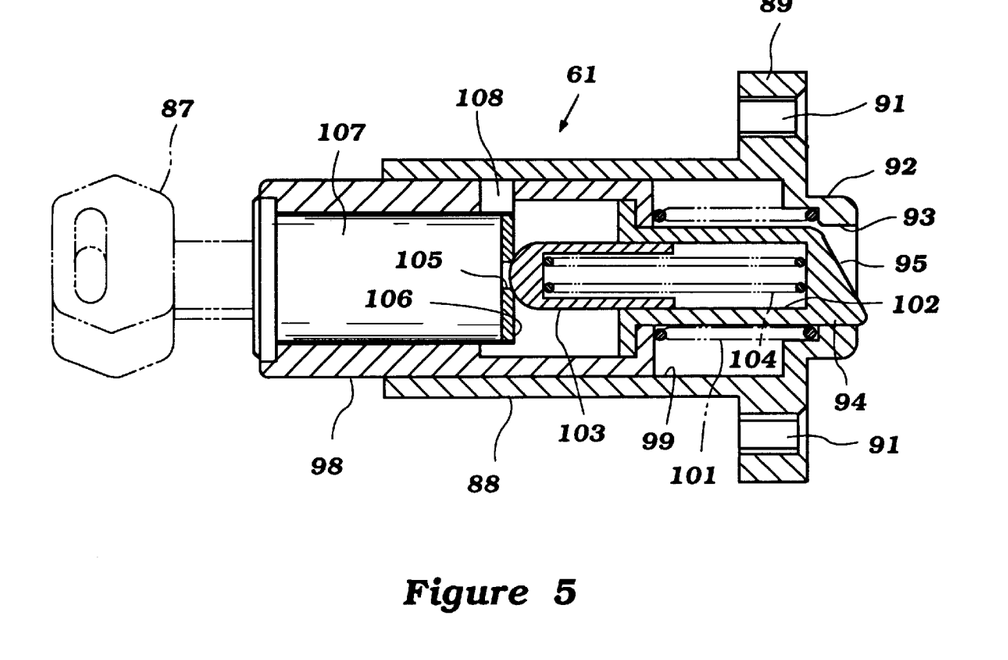
FIG. 5 is an enlarged cross-sectional view of the battery lock showing the key in phantom.
Figure 6:
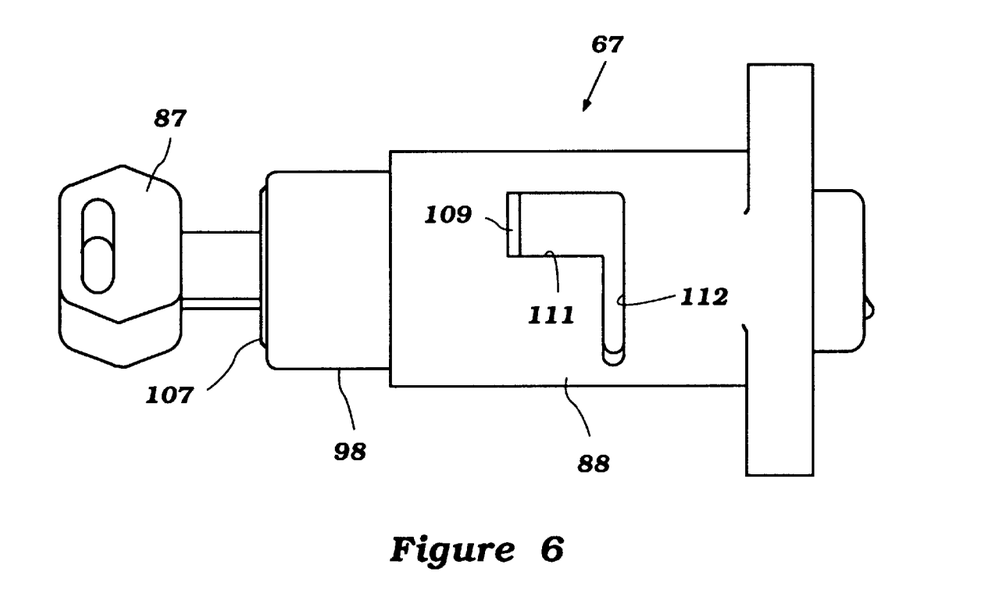
FIG. 6 is a side elevational view of the battery lock looking in the same general direction as FIG. 5 but shows the key in solid lines.
Figure 7:
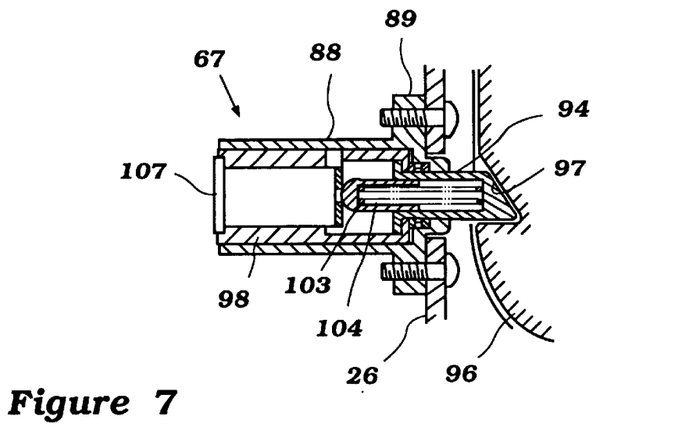
FIG. 7 shows the locked position.
Figure 8:
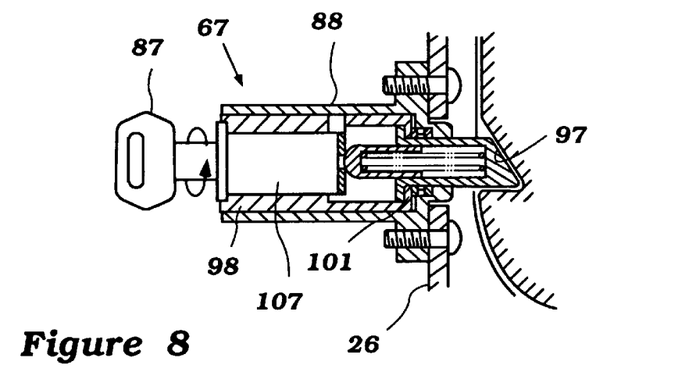
FIG. 8 shows the insertion of the key prior to release of the lock and rotation thereof to the unlocked position.
Figure 9:
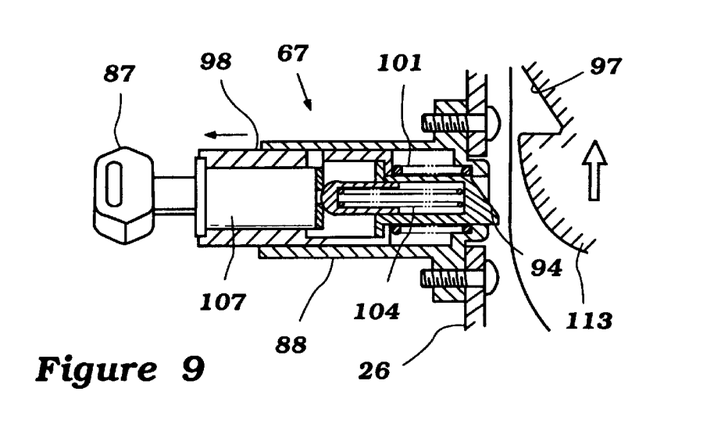
FIG. 9 shows the lock released and the battery carrier released and partially removed.

Also contained within the cylinder 98 is a tumbler mechanism 107 that acts to lock the cylinder 98 in either the unlocked position as shown in FIGS. 5, 6 and 9 or in its locked position as shown in FIGS. 7, 8, 10 and 11.

The cylinder 98 is formed with an open slot 108 into which a tab 109 (FIG. 6) of the end plate 106 extends. This tab 109 extends through the opening 108 in the cylinder 98 and into an L-shape opening having a short wide leg 111 and a long narrow leg 112 is formed. The plate 106 is coupled with the tumbler of the locking mechanism 107 and thus, rotates with the key 87. The purpose of this mechanism including the tab 109 and slot comprising the portions 111 and 112 is such that it will ensure that the key must be placed in a locked condition before it can be removed from the tumbler 107.

Hence, FIGS. 5 and 6 show the mechanism in its released position wherein the battery may be removed. However, in this position the key 87 cannot be removed from the tumbler 107. In order to accomplish this, the key 87 and tumbler 107 and cylinder 98 must be moved to the right as shown in FIG. 6 so that the tab 109 traverses the slot 111 and comes into registry with the slot 112. At this time, the key 87 can be rotated in a clockwise direction viewed from the left and the key may then be removed. FIG. 7 shows the condition when this locking has occurred.

Thus, if it is desired to remove the battery carrier 65 for charging of the batteries, the key 87 must be inserted into the tumbler 107 and the key rotated in a counter clockwise direction as shown by the arrow in FIG. 8.

This rotation continues until the tab 109 moves along the slot portion 112 and registers with the slot portion 111. When this occurs, the action of the spring 101 will be sufficient to urge both the locking member 94 to the left so as to clear the notch 97 in the battery carrier 96 and permit its removal. This will cause the tab 109 to traverse the slot portion 111. At the same time, the action of the spring 104 on the plunger 103 will cause the cylinder 98 and tumbler 107 also to move in this direction supplementing the action of the spring 101. Hence, the mechanism will then be in the final released position as shown in FIG. 9 and the battery carrier 96 can be removed for recharging of the battery.

Figure 10:
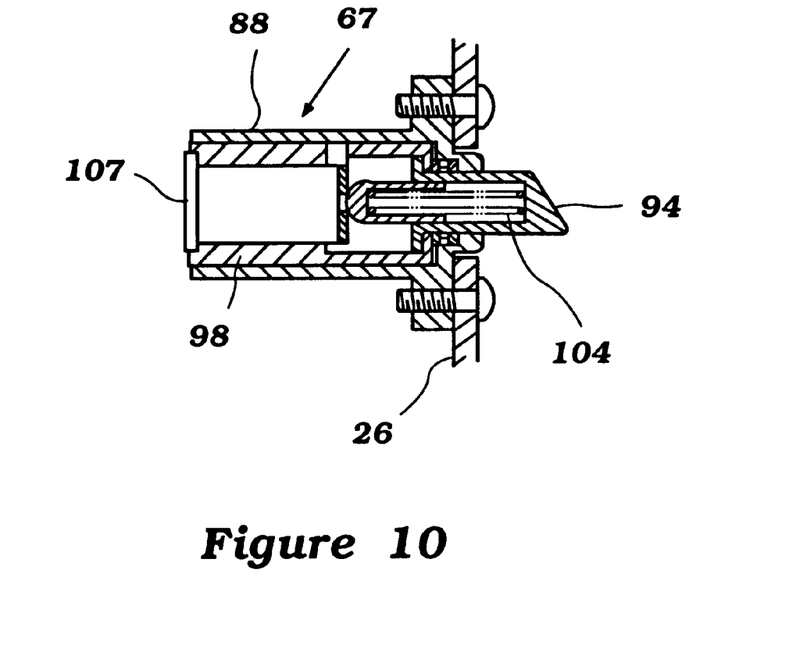
FIG. 10 shows the condition after the battery carrier has been removed and the key has been removed from the lock.

However, the key 87 cannot be removed. Thus, in order to remove the key 87 the operator must again trigger the locking mechanism 67 to its locked position. This is done by moving the tumbler 107 and cylindrical plunger 98 to the right and to the position shown in FIG. 10. Then, the key is rotated and the tab 109 moves into the slot portion 112 so as to retain the plunger 98, tumbler 107 and locking member 94 in the locked position as shown in FIG. 10. The key then can be removed as indicated by its absence from FIG. 10.

Figure 11:
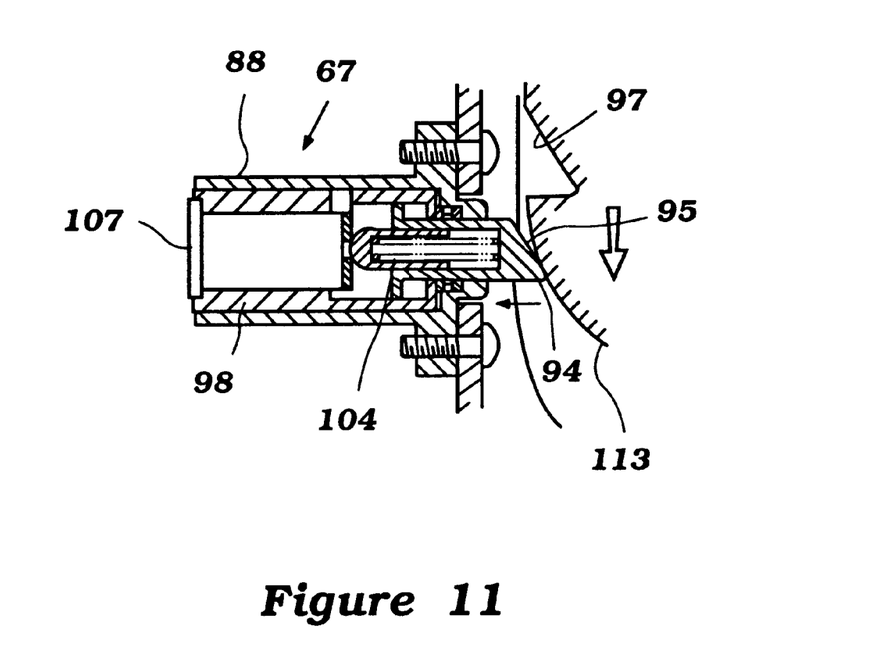
FIG. 11 shows the reinsertion of the battery in place to illustrate how the automatic locking occurs.

When the batteries have been charged and the battery carrier 65 is reinstalled, a curved lower end 113 of the battery carrier will engage the inclined surface 95 of the locking member 94 and urge it to the left as shown in FIG. 11. This movement is accomplished by compressing the relatively light spring 104. Once the battery carrier 65 is fully inserted to the position shown in FIG. 7, the lock 67 will reengage.

It has been noted that the bicycle is provided with the wheel lock 62. Preferably that wheel lock is keyed so as to also be operated by the key 87 of the battery lock 67.

Thus, it should be readily apparent from the foregoing description that the described mechanism provides very simple yet high effective battery carrier lock arrangement for the batteries of an electrically assisted vehicle and particularly a small open vehicle such as bicycle.

Of course, the foregoing description are those of a preferred embodiment of the invention and various changes and modifications may be made without departing from the spirit and scope of the invention as defined by the appended claims.

What is claimed is:

1. A detachable battery lock assembly for an electrically powered vehicle comprising a battery box having an opening configured to receive a complimentary configured elongated battery carrier and fixed to the vehicle in an accessible position, said battery carrier having a locking portion formed thereon, said battery box including a selectively engageable lock that cooperates with said battery carrier locking portion to lock said battery carrier in said battery box and a key operated release for said lock, said lock having a locking element supported by said lock for movement between a locked position adapted to engage said battery carrier locking portion and a released position relative to said lock and biased to said locked position for retaining said battery carrier in said battery box when a battery carrier is received in said battery box, said lock being moveable between a locked position relative to said battery case, wherein said locking element will engage and lock said battery carrier locking portion when inserted into said battery box, and a released position wherein said battery carrier can be removed from said battery box regardless of the condition of said locking element, said key operated release being moveable between a locking position wherein said lock is maintained in its locked position and a released position wherein said lock moves to a released position, said key operated release including means for preventing the key from being removed from said key operated release until said key operated release is in its locking position, said battery carrier capable of being reinserted into said battery box to the locked position when the lock is in the locked position with a key removed therefrom.

2. A detachable battery lock assembly for an electrically powered vehicle as set forth in claim 1 wherein the locking element comprises a spring biased keeper engageable with a recess in the battery carrier for retaining the battery carrier in the battery box when said lock is in its locked position.

3. A detachable battery lock assembly for an electrically powered vehicle as set forth in claim 2 wherein the spring biased keeper has a camming surface that is adapted to be engaged by the battery carrier when said battery carrier is placed in position for camming the keeper toward a released position and for engagement of the keeper in the battery carrier recess when the battery carrier is fully inserted into the battery box.

4. The detachable battery lock assembly for an electrically powered vehicle as set forth in claim 1, wherein the vehicle comprises a bicycle having a seat post adapted to receive a bicycle seat, and a rear fender disposed to the rear of said seat post, the battery box being positioned between said seat post and said rear fender.

5. A detachable battery lock assembly for an electrically powered vehicle as set forth in claim 4 wherein the lock is carried by a base portion of the battery box.

* * * * *